March 13, 1956  J. D. MacKNIGHT  2,738,488
MARINE CABLE FOR SEISMIC SURVEYING OF SUBMERGED AREAS
Filed Jan. 18, 1950  2 Sheets-Sheet 1

INVENTOR.
J. D. MACKNIGHT
BY
ATTORNEYS

March 13, 1956  J. D. MacKNIGHT  2,738,488
MARINE CABLE FOR SEISMIC SURVEYING OF SUBMERGED AREAS
Filed Jan. 18, 1950  2 Sheets-Sheet 2

INVENTOR.
J. D. MACKNIGHT
BY
ATTORNEYS

United States Patent Office 2,738,488
Patented Mar. 13, 1956

2,738,488

MARINE CABLE FOR SEISMIC SURVEYING OF SUBMERGED AREAS

John Donald MacKnight, Mount Vernon, N. Y., assignor, by mesne assignments, to The Texas Company, New York, N. Y., a corporation of Delaware Application January 18, 1950, Serial No. 139,254

7 Claims. (Cl. 340—7)

This invention relates to a marine cable for seismic surveying of submerged areas and more particularly to an electrical conductor cable for transmitting signals from seismic detectors to suitable receiving and recording instruments carried on a boat, barge, vessel or other transporting means.

The invention contemplates a conductor cable having an exterior wrapping providing a rough exterior surface effective for cutting into and through sand and silt as the cable is dragged across a submered area. More specifically the invention contemplates a cable comprising a conductor cable having a continuous metal strip member spirally wrapped about the exterior thereof, the pitch of the spiral being such that adjacent convolutions are spaced substantially apart along the cable thereby providing means effective for cutting into and through the aforesaid sand and silt.

It is customary practice in the seismic surveying of submerged areas, such as lake bottoms, to employ a conductor cable, which may be several hundred feet in length, to which is attached a plurality of seismic detectors each spaced apart along the cable. For example, the detectors or detector leads may be spaced at twenty-five foot intervals although the spacing may vary from this as desired. One end of the cable is connected to a surveying vessel carrying the signal receiving and recording instruments. In operation the vessel drags the cable across the surface of the submerged area, the forward movement being discontinued so that the cable remains in a stationary position during the recording of reflected sound waves created by the firing of a shot from a shot boat or vessel.

When a seismic or acoustic disturbance is created in the underwater surface of the earth by the firing of the shot, the seismic wave travels outwardly through the earth's surface. When the sound wave reaches a hard stratum in the earth's substance, a portion of the wave energy is reflected with rays passing to each detector. Each detector converts the wave energy received by it into electrical energy, as is well known and as has been described, for example, in U. S. Patent No. 2,130,213, granted to Wolf, Cowles and Richardson, September 13, 1938.

Other types of geophones may be used and in the present instance it is contemplated that the geophones may be connected integrally with the cable.

A feature of the cable of this invention involves the provision of a roughened exterior surface or cutting means adapted to permit the cable to cut into the sand and silt so that the cable buries itself substantially in the submerged soil. This submergence or burying of the cable in the mud, silt or sand effects a substantial reduction in the amount of background noise such as that created by the movement of the water. Such background noise is picked up by the cable and adversely affects and interferes with the receiving and recording of seismic waves. Therefore, an object of the present invention is to avoid or at least substantially reduce the amount of background noise.

A conventional conductor cable comprises at least one electrical conductor and usually comprises a plurality of electrical conductors suitably insulated from each other and bonded together to form a single unitary cable. This cable may be covered or encased in an outer and protective layer or wrapping of insulating material and may or may not be provided with a flexible armored covering for protection against excessive wear and tear in service.

A typical armored cable, as later described in connection with the drawing consists of about twenty-eight stranded rubber insulated conductors surrounded by a neoprene jacket about 0.06 inch in thickness, which is in turn surrounded by a varnished woven braid. This braid covered cable is armored by one layer of thirty strands of 0.065 inch diameter stainless steel spiraled counterclockwise and one layer of twenty-four strands of 0.10 inch diameter stainless steel spiraled clockwise. The helix angle of both layers of armor is approximately 72°.

In accordance with the present invention, this armored cable is spirally wrapped, preferably counterclockwise, to the outer armored layer with a steel strip member or strand, the pitch of the spiral being at least as great as the width of the strip member or strand and preferably from one to four times the width of the strip member or strand.

Advantageously, the metal strip member is the same steel stripping used in the armored layers. However, it is contemplated that a different material such as wire, for example, may be employed.

While an armored cable has been specifically described, nevertheless it is contemplated that the invention may be employed with non-armored cable. The non-armored cable may be covered by an outer jacket of tough rubber, plastic or other material, and the metal strip member spirally wrapped about this outer jacket.

In order to illustrate the invention in more detail, reference will be made to the figures of the accompanying drawing.

Figures 6 and 7 illustrate a typical armored cable such as previously referred to.

Figure 1:
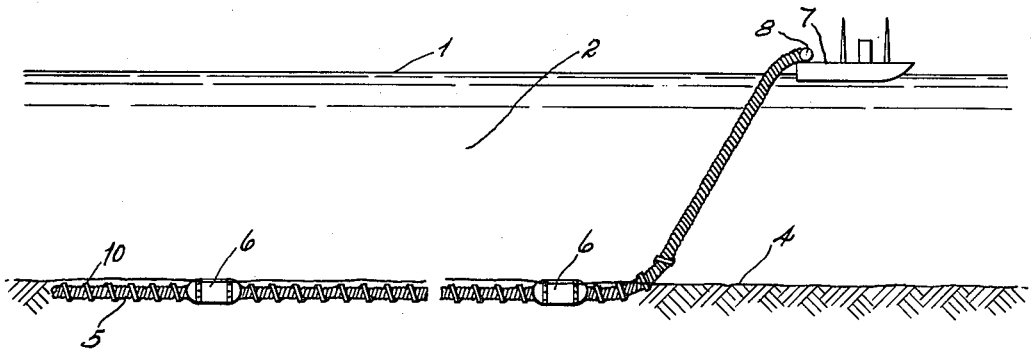
Figure 1 illustrates schematically the cable of this invention as employed in seismic surveying of underwater areas.

In Figure 1, the numeral 1 designates the surface of a body of water 2. The submerged layer of soil 4 comprises mud, silt, sand or mixtures thereof.

Numeral 5 designates an armored conductor cable to which are connected integrally a plurality of geophone chambers 6, the chambers being uniformly spaced apart, as previously indicated.

The manner of attaching the chambers to the cable is conventional and need not be described in detail. Also, as well known, the manner of supporting a geophone mechanism within its chamber may be conventional, as is also the means of electrical connection between the geophone and its respective conductor component of the cable 5.

The leading end of the cable is connected to a towing vessel 7 having a cable reel 8, the vessel also bearing the usual signal receiving and recording apparatus not specifically indicated.

Numeral 10 designates a steel cutting strip spirally wrapped about the cable 5 in a manner such as to be effective for cutting a groove through the mud and silt as the cable is dragged along by the vessel 7. Due to this cutting action the cable, at least the section between adjacent geophone chambers, becomes buried in the silt or mud to a depth of a few inches or more, depending upon the character of the mud and silt.

In the event that the diameter of the geophone chambers is not substantially larger than that of the cable, then these chambers likewise will become buried or partially buried in the mud and silt, etc. If desired, the exterior geophone containers may be provided with a cutting spiral.

Figure 2:
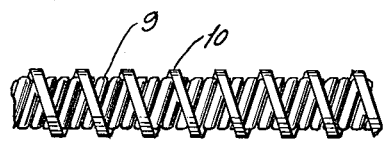
Figure 2 illustrates a section of armored cable wrapped with a steel cutting spiral.
Figure 3:
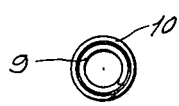
Figure 3 is a cross sectional view of the armor and cutting spiral of Figure 2.

In Figure 2 the numeral 9 designates the armored layer of the cable 5. As indicated, this armored layer is formed by winding a steel strip spirally around the exterior of the conductor cable, the pitch of the spiral being such that the adjacent convolutions of the steel strip are contiguous or overlap slightly. The numeral 10 designates the spiral cutting element which comprises a stainless steel strip wound spirally around the cable counter-clockwise to the armor strip. As indicated, the adjacent convolutions of the cutting spiral 10 are spaced substantially apart from each other.

Figure 4:
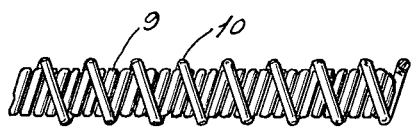
Figure 4 illustrates a section of armored cable wrapped with a cutting wire or strand.
Figure 5:
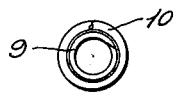
Figure 5 is a cross sectional view of the armor and cutting spiral of Figure 4.

In Figure 4, the conductor cable is similarly enclosed in a layer of armor 9 but the cutting spiral 10 comprises a wire or stranded wire cable.

Thus it will be seen that the cutting spiral 10 does not materially interfere with the desired flexibility of the cable and even adds substantially to its strength. It also provides additional protection against wear and tear, in addition to performing the function of providing a rough exterior surface effective for cutting through the submerged soil as the cable is dragged thereover.

Figure 6:
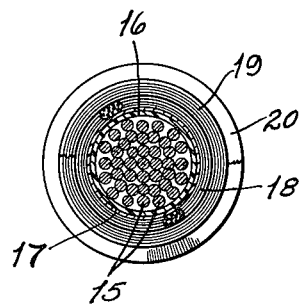
Figure 7:
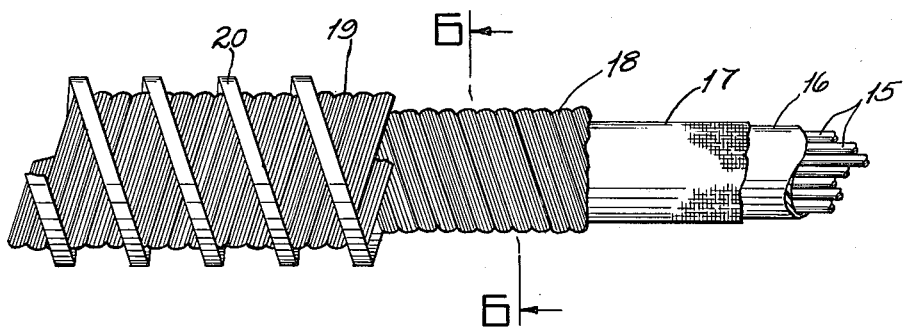

The cable illustrated in Figures 6 and 7 comprises a plurality of individually insulated conductors 15 surrounded by a neoprene jacket 16 which is in turn surrounded by a sheath of varnished woven braid 17. Wrapped around the braid in a counter-clockwise direction is a stainless steel wire 18 consisting of about thirty individual strands, each of 0.065 inch in diameter, so as to form a continuous layer of armor. Wrapped around the exterior of this first layer of armor is a stainless steel wire 19 consisting of about twenty-four individual strands each about 0.10 inch in diameter, the wire 19 being spiraled in a clockwise direction so as to form a continuous outer layer of armor. The helix angle of both wrappings is approximately seventy-two degrees. A steel strip member 20 of rectangular cross-section is spirally wrapped around the exterior of the second armored layer in a counter-clockwise direction, the pitch of this last mentioned spiral being at least as great as the width of the strip member.

Although the geophones 6 have been illustrated and described as being connected directly into the cable, i. e., as forming integral parts of the cable, it is contemplated that they may be separate from the cable, each geophone being connected to the main cable by a branch lead of from a few inches to a few feet in length. In this case, if the geophones are materially larger in diameter than the cable they may remain on the "bottom" while the entire main cable will be able to cut its way one or more inches into the submerged soil so that, as explained hereinbefore, it will not be subjected to movement of the water.

Obviously many modifications and variations of the invention, as hereinbefore set forth, may be made without departing from the spirit and scope thereof, but only such limitations should be imposed as are indicated in the appended claims.

I claim:

1. A seismic marine cable adapted for dragging over and cutting into a water-submerged surface comprising at least one electrical conductor enclosed in an insulating sheath, a metallic strand spirally wrapped about the exterior of said sheath to form a first armor layer, another metallic strand spirally wrapped counter to and over the exterior of said first layer to form a second armor layer, a continuous metal strip member of substantially rectangular cross-section spirally wound over said second layer, the pitch of the spiral of said wound member being such that adjacent convolutions are spaced substantially apart from each other along the cable, thereby providing means effective for cutting into and through submerged soil as the cable is dragged across a submerged area, and a geophone attached to the cable at each of a plurality of points spaced along the length of at least a portion of the cable and in electrical communication with a conductor therein.

2. A seismic marine cable adapted for dragging over and cutting into a water-submerged surface comprising at least one electrical conductor enclosed in an insulating sheath, a layer of metal wire consisting of a plurality of individual strands and spirally wrapped about the exterior of said sheath, another layer of metal wire consisting of a plurality of individual strands and spirally wrapped counter to and over the first layer, a continuous metal strip member spirally wound over said second layer, the pitch of the spiral of said wound member being such that adjacent convolutions are spaced substantially apart from each other along the cable, thereby providing means effective for cutting into and through submerged soil as the cable is dragged across a submerged area, and a geophone attached to the cable at each of a plurality of points spaced along the length of at least a portion of the cable and in electrical communication with a conductor therein.

3. A seismic marine cable adapted for dragging over and cutting into a water-submerged surface comprising a plurality of insulated electrical conductors enclosed in a sheath, a layer consisting of a plurality of stainless steel strands spiralled counter-clockwise about the exterior of said sheath, another layer consisting of a plurality of stainless steel strands spiralled clockwise about the exterior of said first layer, the helix angle of both layers being approximately seventy-two degrees, a continuous metal strip member spirally wound about the exterior of said second layer, the pitch of the spiral of said wound member being at least as great as the width of the strip member, and a geophone attached to the cable at each of a plurality of points spaced along the length of at least a portion of the cable and in electrical communication with a conductor therein.

4. A seismic marine cable adapted for dragging over and cutting into a water-submerged surface in accordance with claim 2 wherein said geophone has a diameter not substantially larger than said cable.

5. A seismic marine cable adapted for dragging over and cutting into a water-submerged surface in accordance with claim 2 wherein said geophone is spirally wrapped with a continuous metal strip member.

6. A seismic marine cable adapted for dragging over and cutting into a water-submerged surface in accordance with claim 2 wherein said geophone has a materially larger diameter than said cable.

7. In the method of seismic exploration of water covered areas wherein a conductor cable to which is attached a plurality of seismic detectors is intermittently pulled along in contact with the submerged bottom of said water covered area, the improvement which comprises pulling said cable and simultaneously cutting said cable into said submerged bottom so that said cable is at least partially buried in said bottom whereby the detection by said detectors of background noise, such as is created by movement of water against said cable, while said cable is at rest is reduced.

References Cited in the file of this patent

UNITED STATES PATENTS

| | | |
|---|---|---|
| 168,352 | Sloan | Oct. 5, 1875 |
| 238,999 | Watson | Mar. 15, 1881 |
| 614,597 | Wrigley | Nov. 22, 1898 |
| 815,163 | Hatfield | Mar. 13, 1906 |
| 1,060,785 | Pahl | May 6, 1913 |
| 1,626,777 | Austin | May 3, 1927 |
| 1,844,433 | Markowitz | Feb. 9, 1932 |
| 2,003,990 | Carlson et al. | June 4, 1935 |
| 2,551,417 | Carlisle | May 1, 1951 |

FOREIGN PATENTS

| | | |
|---|---|---|
| 332,177 | Great Britain | July 17, 1930 |